May 19, 1953   M. A. KARPELES   2,639,386
NOISE COMPRESSOR
Filed Aug. 30, 1950
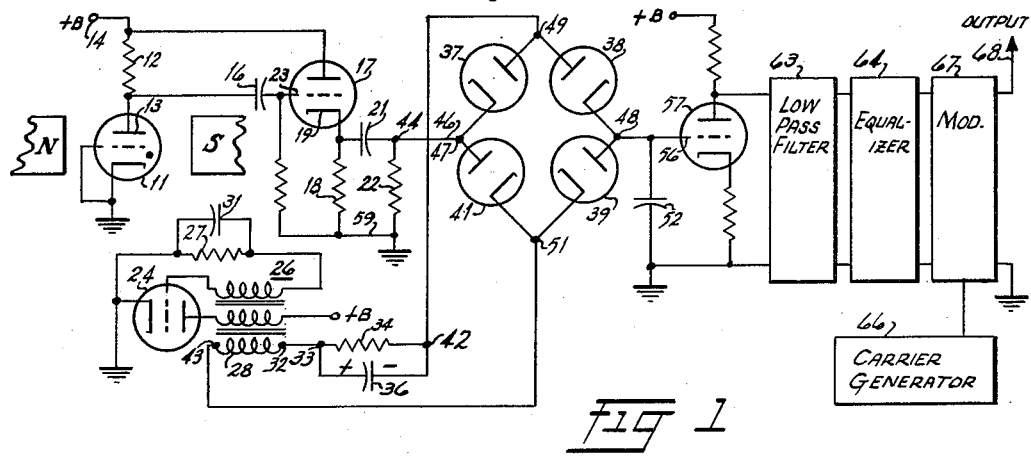
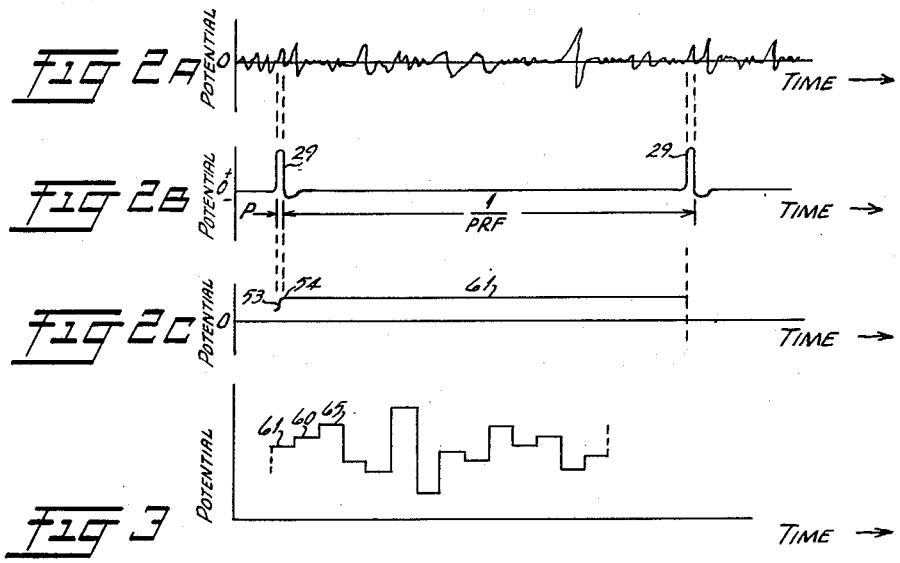
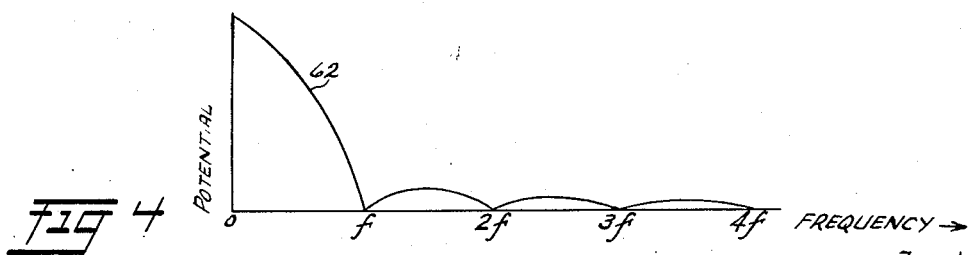
Inventor
MARK A. KARPELES
By H. A. Mackey
Attorney Patented May 19, 1953

2,639,386

UNITED STATES PATENT OFFICE 2,639,386

NOISE COMPRESSOR

Mark A. Karpeles, Tarrytown, N. Y., assignor to General Precision Laboratory Incorporated, a corporation of New York Application August 30, 1950, Serial No. 182,221

2 Claims. (Cl. 250—36)

This invention pertains to noise compressors and more particularly to devices for converting a wide band noise spectrum to a noise spectrum having any desired bandwidth and centered about any desired frequency without loss of noise power.

In the electronic art the term "noise" is defined as random electrical fluctuations, and the frequencies contained in a noise potential are spoken of collectively as the noise frequency spectrum. Also, the electrical potential produced in a circuit by such noise is frequently termed noise and it is thus that the term is here used.

In many instances in testing various electronic systems it is desirable to impress noise thereon confined to the bandwidth of the particular system under test. Available noise sources, however, have wide band frequency spectra so that generally only a small portion of the spectrum is required for testing any particular system. In the past the utilization of such noise sources has been inefficient and has required relatively complex apparatus in segregating the desired portion of the generated noise spectrum. For example, one well known system requires the use of a wide band noise source of any desired type and a frequency selective band-pass filter for selecting the required frequency band. Such an arrangement is cumbersome and difficult to adjust as well as being inefficient since the output energy so derived bears the same relation to the input energy obtained from the noise generator as the width of the output spectrum bears to the bandwidth of the noise generator.

On the other hand, the instant invention contemplates the use of apparatus, for deriving a narrow spectrum of noise from a broad band noise spectrum, which is capable of easy adjustment and which is relatively simple and economical.

Additionally, and of even greater importance, is the highly increased efficiency of performance realized by the use of the apparatus of the present invention since such apparatus produces a noise output the magnitude of which is comparable in magnitude to that of the input energy, rather than being a small fraction thereof.

In general, the instant invention consists of a wide band noise generator or of means for procuring noise from an external source, a gate or pulse generator so correlated with the noise generator as to control and permit passage of samples of the generated noise and apparatus for storing the samples of noise or of potentials representative of it.

Although the principal utility of this invention resides in its application to noise voltages, it is also applicable to any other types of input voltage embracing a frequency spectrum or having a frequency bandwidth.

The principal purpose of this invention is, therefore, the provision of improved means for compressing a noise frequency spectrum.

A further purpose of this invention is the provision of improved means for compressing the frequency spectrum of any electrical potential by periodical sampling to produce a potential having a narrower frequency spectrum.

A further understanding of the invention can be secured from the following detailed description and the drawings, in which:

Figure 1 schematically illustrates the circuit of the invention.

Figures 2A, 2B, 2C, 3 and 4 illustrate graphically the operation of the invention.

Referring now to Fig. 1, a gas-filled electronic tube 11 is employed as a noise generator. Such a tube, as is well known, spontaneously generates random fluctuations of anode voltage extending over a very wide frequency range. In the case of one type of thyratron tube the range extends from nearly zero cycles per second to over 5 megacycles (mc.), and for the purpose of this example, the tube 11 is considered to generate noise having a frequency spectrum extending from 25 cycles to 5 mc. per second.

The tube 11 is placed in a transverse constant magnetic field that is conveniently produced by a permanent magnet having north and south poles, N and S. This field has the property of eliminating undesirable oscillations and at the same time increasing the level of the high frequency noise components. The values of magnetic field, load resistance, and operating current are such as to produce the greatest noise and flattest frequency distribution while minimizing periodic oscillations. For a tube, such as that known as 6D4, a magnetic field of 375 gauss, a 25,000 ohm nonreactive load resistor and a current of 5 milliamperes have been found to be effective. The tube 11 in Fig. 1 may for purposes of explanation be considered as of this type operating at 5 milliamperes, the plate load of which consists principally of a nonreactive resistor 12 having a resistance of 25,000 ohms connected between the plate 13 and the terminal 14 of a positive potential source.

The noise generator tube 11 is coupled through a condenser 16 to a cathode follower tube 17 serving as an impedance transformer, having a cathode resistor 18 which is of low resistance, for instance, 500 ohms. The output energy is coupled from the cathode 19 of the tube 17 by means of a coupling condenser 21 having an output side normally maintained at zero or ground potential bias by a resistor 22. The time constant of the condenser 21 with resistor 22 combination is chosen to be greater than 1/25 second, the period of the lowest frequency required to be passed. The time-potential graphic representation of the noise applied to the control electrode 23 of the tube 17, and also of the noise output of the condenser 21, is as illustrated in Fig. 2A.

Electrical potential pulses or gates are employed to control the noise output of the condenser 21. For the purpose of illustration a portion only of the generated noise is chosen for utilization, consisting of a band of frequencies extending from 25 cycles per second to one megacycle per second. From this band and from the interaction between it and the controlling gates a continuous output noise spectrum is to be produced, the upper and lower frequency limits of the output being chosen to be zero and 1000 cycles per second. From this output spectrum a spectrum covering the range from 49 to 51 kilocycles is produced by modulation techniques.

In order for this output noise to be obtained from the specified band of input noise, the gates or pulses must each be approximately 1μs. wide, and the number per second, or pulse repetition frequency (P. R. F.) must be 1000.

The gate generator preferred for use with the foregoing parameters consists of a tube 24, a pulse transformer 26, and a bypassed grid leak resistor 27, connected to form a blocking oscillator. The output energy of this oscillator is taken from the winding 28 of the pulse transformer 26, and has the wave form illustrated in Fig. 2B. In this figure the pulse width, P, is the width of the major pulse 29, its 1μs. width being determined principally by the characteristics of the pulse transformer 26. The resistor 27 and condenser 31 are designed to have an effective time constant resulting in the production by tube 24 of 1000 pulses or gates per second, as indicated, but not to scale, in Fig. 2B.

The transformer terminal 32 is positive during the time of its energization as represented by the major peak 29, Fig. 2B, and is connected to a terminal 33 of a gate-closing timing circuit consisting of a resistor 34 in parallel with a condenser 36. The period of this gate-closing timing circuit is preferably from 10 to 100 times the pulse repetition period and in the example here set forth is selected as 1/20 second.

The four diodes 37, 38, 39 and 41 comprise an electronic flow control or valve having the function of opening and closing a circuit from the output terminal of the condenser 21 under control of the gate circuit. To this end the four diodes are connected in two shunt paths between the terminal 42 of the gate-closing timing circuit and the terminal 43 of the pulse transformer winding 28. All diodes are poled to conduct in the path from terminal 42 through terminals 49 and 51 to terminal 43. The output terminal 44 of the condenser 21 is connected through conductor 46 to the common terminal 47 of the diodes 37 and 41, while the common terminal 48 of the diodes 38 and 39 constitutes the output terminal of the diode network or electronic valve, and is connected to a grounded storage condenser 52.

In operation, the generation of a gate pulse by the blocking oscillator 24 causes the pulse transformer terminal 32 to become momentarily highly positive and the terminal 43 correspondingly negative. The connected valve terminals 49 and 51 accordingly become positive and negative respectively, and cause conduction through one path including the series connected diodes 37 and 41, as well as through the path in shunt thereto composed of the series connected diodes 38 and 39. Thus all four diodes become highly conductive for the duration of each gate. This being the case the two paths from terminal 47 to terminal 48, one through diodes 37 and 38 and the other through diodes 41 and 39 are also conductive. As a result, the noise applied to the terminal 47 appears at the terminal 48 and tends to charge or discharge the condenser 52. This condenser considered with the charging resistance comprising the effective resistance of the four diodes in series with the cathode follower driving impedance 18 constitutes an integrating circuit having its output at the terminals of condenser 52. This integrating circuit is the more nearly perfect as its time constant is increased. In this example, however, it is desired to make the time constant short compared with the duration of the gating pulse, so that the highest frequencies in the input noise desired to be made effective will be represented by the charging action upon condenser 52. An appropriate value for this capacitance is 200 μμf. The potential which this condenser has attained at the end of any gate is then the result of integration of the noise applied during the gate. This complex potential growth is represented at 53 in Fig. 2C, its final value at the time of termination of the gate being represented by potential 54. At this time the potential is removed from the transformer winding 28 or may even be reversed. However, during the gate a potential drop is produced in the resistor 34, charging the shunt condenser 36, so that at termination of the gate the charge in the condenser 36 is effective to impose a potential on terminals 49 and 51, 49 being made negative and 51 positive. Under these potentials the tubes 37, 38, 39 and 41 become infinite in impedance, shutting off the path from terminal 47 to terminal 48 and stopping the noise flow to the condenser 52. This condition persists until the next gate because of the slowness of discharge of the condenser 36 through the high resistance. The condenser 52 is thus isolated and therefore remains charged to a constant value during the interval between gates, its output being loaded only by a very high impedance device, such as for instance the unleaked grid 56 of a tube 57. In such a case a grid return path exists only during gate pulses, through a path consisting of the valve diode 48, terminal 49, diode 37, conductor 46, resistor 22, and conductor 59 to ground. The persistence of output voltage between gates is indicated at 61 in Fig. 2C.

To summarize, the regular application of short gates to the valve circuit results in the application of longer pulses to the storage condenser, forming a square wave consisting of a series of voltage steps or pulses 60, 61 and 65 as illustrated in Fig. 3. The pulses succeed each other without intermission and in general each pulse differs from each other pulse in height or voltage magnitude, the probability distribution of the heights of the pulses being the same as in the input noise. Each pulse represents a voltage sample of the input noise, each sample being a function of the integrated voltage thereof during the gate that initiates it.

Any such series of rectangular pulses behaves in all respects as if it were an aggregate of a great number of frequencies of sinusoidal voltages. In the case of the series of Fig. 3, a plot of the frequency distribution versus voltage magnitude results in the graph of Fig. 4, in which $f$ is the reciprocal of the duration of each pulse. This frequency $f$ is, of course, also the pulse repetition frequency (P. R. F.) of the gate generator.

The graph of Fig. 4 theoretically stretches to infinity at the right, thus including all frequencies from zero to infinity except $f$ and integral multiples of it. All of these included frequencies therefore appear at the output terminals of the condenser 52 and are impressed upon the control grid 56. It should here be pointed out that, as shown in Fig. 4, the lower limit of these frequencies extends down to zero.

Utilization of this energy output of the embodiment of the invention is desired to be confined to the first lobe 62 of the curve of Fig. 4, extending from zero frequency to $f$. This lobe is easily isolated by a conventional low pass filter 63, Fig. 1, following the high input impedance amplifier represented by the tube 57. However, even if not so isolated there is such a preponderance of energy in the first lobe (90%) as to make unnecessary, in many cases, the use of a filter to produce a powerful output noise signal that is substantially all in the 0 to $f$ band. If it is desired to bring all frequencies to a constant voltage level the filter 63 is followed by a conventional frequency-equalizing network 64. In the example $f=1000$ C. P. S., and therefore the resulting output frequency band extends from zero to 1000 C. P. S.

It is, of course, easily possible to shift this noise spectrum output to any part of the frequency spectrum by providing a carrier generator 66 and a modulator 67. The resulting output is a 2000-cycle band centered at the carrier frequency, being the carrier frequency plus and minus the modulating noise maximum frequency. Thus, if the carrier frequency is 50 kc., the noise band will be 49–51 kc. This 2000-cycle band of noise is available at the output conductor 68. Double sideband output can of course, be changed to single sideband output by succeeding the modulator 67 with a suitable filter.

In carrying out the objects of this invention, it is of course obvious that the noise generator may be of any kind. Instead of a gas tube a high-vacuum tube may be employed in a circuit similar to the intermediate frequency amplifier circuit of a radio receiver. In such a circuit having high gain, thermal noise or shot noise can be amplified and used. Alternatively, noise originating in a photomultiplier tube can be amplified and utilized.

Similarly many circuits other than the blocking oscillator circuit can alternatively be used for gate generation, such as for instance, a multivibrator or saw-tooth generator circuit, followed by suitable amplification and pulse shaping.

Instead of the diode valve circuit of Fig. 1 a number of other circuits can alternatively be employed, such as a pentode or triode gating circuit, or any of numerous more complex electronic switching circuits.

What is claimed is:

1. A noise compressor comprising, a noise generator, a four arm bridge circuit having a unidirectional conducting device in each of said arms, said devices being so poled as respects each other that current is permitted to flow in only one direction between one pair of opposite conjugate terminals, a pulse generator generating a train of pulse signals each of which has a time duration equal to the reciprocal of the maximum frequency of the noise spectrum selected for utilization, the pulse repetition frequency of said train of pulses being equal to the desired output bandwidth, a circuit connecting the output circuit of said pulse generator between said one pair of conjugate terminals whereby said bridge circuit is rendered conductive during the occurrence of said pulses, a condenser connected to one of the remaining pair of conjugate terminals of said bridge circuit, a circuit connecting the output of said noise generator to the remaining terminal of said last mentioned pair of conjugate terminals, and a circuit connected to said condenser deriving from the energy stored therein a noise signal having the requisite narrow frequency spectrum.

2. A noise compressor comprising, a noise generator, a four arm bridge circuit having a unidirectional conducting device in each of said arms, said devices being so poled as respects each other that current is permitted to flow in one direction between one pair of opposite conjugate terminals but is prevented from flowing in the opposite direction, a pulse generator generating a train of pulses each of which has a time duration equal to the reciprocal of the maximum frequency of the noise spectrum selected for utilization, the pulse repetition frequency of said train of pulses being equal to the desired output bandwidth, a circuit connecting the output circuit of said pulse generator between said one pair of conjugate terminals whereby said bridge circuit is rendered conductive during occurrence of said pulses, means for imposing a potential of such polarity on said bridge circuit as to block current flow therein in the absence of pulse signals, a condenser connected to one of the remaining pair of conjugate terminals of said bridge circuit, a circuit connecting the output of said noise generator to the remaining terminal of said last mentioned pair of conjugate terminals, and a circuit connected to said condenser deriving from the energy stored therein a noise signal having the requisite narrow frequency spectrum.

MARK A. KARPELES.

References Cited in the file of this patent

UNITED STATES PATENTS

| Number | Name | Date |
| --- | --- | --- |
| 2,416,307 | Grieg | Feb. 25, 1947 |
| 2,443,195 | Pensyl | June 15, 1948 |
| 2,496,338 | Barton | Feb. 7, 1950 |
| 2,553,284 | Sunstein | May 15, 1951 |